United States Patent
Borgström et al.

(10) Patent No.: US 7,789,076 B2
(45) Date of Patent: Sep. 7, 2010

(54) DEVICE FOR CLEANING OF CRANKCASE GASES

(75) Inventors: Leonard Borgström, Tyresö (SE); Claes-Göran Carlsson, Tullinge (SE); Hans Moberg, Stockholm (SE); Jan Skoog, Skogås (SE); Carl Häggmark, Täby (SE)

(73) Assignee: Alfa Laval Corporate AB, Lund (SE)

( * ) Notice: Subject to any disclaimer, the term of this patent is extended or adjusted under 35 U.S.C. 154(b) by 436 days.

(21) Appl. No.: 11/720,123

(22) PCT Filed: Nov. 21, 2005

(86) PCT No.: PCT/SE2005/001744

§ 371 (c)(1), (2), (4) Date: Jan. 24, 2008

(87) PCT Pub. No.: WO2006/057597

PCT Pub. Date: Jun. 1, 2006

(65) Prior Publication Data
US 2009/0223496 A1     Sep. 10, 2009

(30) Foreign Application Priority Data
Nov. 29, 2004   (SE)  .................................... 0402894

(51) Int. Cl.
*F02M 25/06* (2006.01)
(52) U.S. Cl. ..................................... 123/572; 123/41.86
(58) Field of Classification Search ......... 123/572–574, 123/41.86
See application file for complete search history.

(56) References Cited

U.S. PATENT DOCUMENTS 5,954,035 A     9/1999   Hofer et al.
(Continued)

FOREIGN PATENT DOCUMENTS

GB           444918         3/1936
(Continued)

OTHER PUBLICATIONS

English translation of Official Decision to Grant in corresponding Russian application No. 2007124372.

*Primary Examiner*—M. McMahon
(74) *Attorney, Agent, or Firm*—Michaud-Kinney Group LLP (57) ABSTRACT

This document describes a device for cleaning of crankcase gases from a combustion engine, and a combustion engine having such a device. An inlet conduit is connected to a crankcase of the combustion engine. A centrifugal separator receives a flow of crankcase gases from the crankcase via the inlet conduit and comprises a routable centrifuge rotor for centrifuging the crankcase gases. A drive device drives the centrifuge rotor. An outlet conduit discharges cleaned crankcase gases from the centrifugal separator. The rotary speed of the drive device, and thus the rotary speed of the centrifuge rotor, is controllable depending on the gas pressure in the crankcase. An export conduit may be connected to the inlet conduit and adapted to enable discharge of a flow of crankcase gases from the crankcase by-passing the centrifugal separator depending on the gas pressure in the crankcase. An import conduit may be connected to the inlet conduit and adapted to enable feeding of a flow of air from the surroundings to the crankcase depending on the gas pressure in the crankcase.

30 Claims, 4 Drawing Sheets

U.S. PATENT DOCUMENTS

| | | | |
|---|---|---|---|
| 6,783,571 B2 | 8/2004 | Ekeroth | |
| 2002/0100465 A1* | 8/2002 | Pietschner | 123/572 |
| 2005/0061305 A1* | 3/2005 | Pietschner | 123/572 |
| 2006/0048761 A1* | 3/2006 | Ekeroth et al. | 123/572 |
| 2006/0090738 A1* | 5/2006 | Hoffmann et al. | 123/573 |
| 2009/0183717 A1* | 7/2009 | Gillenberg et al. | 123/573 |
| 2009/0199826 A1* | 8/2009 | Meinig et al. | 123/573 |

FOREIGN PATENT DOCUMENTS

| | | |
|---|---|---|
| RU | 2023175 | 11/1994 |
| SE | 522473 | 2/2004 |
| SU | 1113576 | 9/1984 |
| WO | WO99/56883 | 11/1999 |
| WO | WO04/001200 | 12/2003 |

* cited by examiner

DEVICE FOR CLEANING OF CRANKCASE GASES

THE FIELD OF THE INVENTION

The present invention refers generally to the cleaning of crankcase gases from a combustion engine, for instance large combustion engines for ships and stationary installations, such as combustion engines for generators, and combustion engines for vehicles such as trucks.

More specifically, the present invention refers to a device for cleaning of crankcase gases from a combustion engine, comprising an inlet conduit, which is adapted to be connected to a crankcase of the combustion engine, a centrifugal separator, which is adapted to receive a flow of crankcase gases from the crankcase via the inlet conduit and which comprises a rotatable centrifuge rotor for centrifuging the crankcase gases, a drive device, which drives the centrifuge rotor, and an outlet conduit, which is adapted to discharge cleaned crankcase gases from the centrifugal separator.

BACKGROUND OF THE INVENTION

One problem associated with the cleaning of crankcase gases deals with maintaining a desired gas pressure in the crankcase. There is a risk of pumping too much crankcase gas out of the crankcase by means of the centrifugal separator, wherein the gas pressure in the crankcase may decrease to an unallowably low level, and for instance be significantly below the surrounding atmospheric pressure. Such a low gas pressure in the crankcase can also arise when the combustion engine runs at an idle speed or at a very low rotational speed. This can have a negative influence on the gaskets sealing the crankcase. In addition, contaminated air can be sucked into the crankcase and give rise to damage. In certain situations there is also a risk that the centrifugal separator would not be able to pump away a sufficient quantity of crankcase gas so that the gas pressure in the crankcase increases to an unallowably high level, significantly above the surrounding atmospheric pressure. This can also have a negative influence on the gaskets and in some cases lead to leakage of crankcase gas from the crankcase of the combustion engine. It is to be noted that combustion engines of various types and from various manufactures are operated at different gas pressures in the crankcase. In certain combustion engines, it is desirable to maintain an overpressure in the crankcase, i.e. a gas pressure which is somewhat higher then the surrounding atmospheric pressure, whereas in other combustion engines it is desirable to maintain a subpressure in the crankcase, i.e. a gas pressure which is somewhat lower then the surrounding atmospheric pressure. The desired level of the gas pressure in the crankcase depends on various factors, for instance the design of the above-mentioned crankcase gaskets.

WO99/56883 (Alfa Laval AB) discloses a device for cleaning of crankcase gases from a combustion engine. The device comprises an inlet conduit, which is connected to a crankcase of the combustion engine, a centrifugal separator, which receives crankcase gases from the crankcase via the inlet conduit and which comprises a centrifuge rotor for centrifuging the crankcase gases, a drive device, which drives the centrifuge rotor and, an outlet conduit for discharge of cleaned crankcase gases from the centrifugal separator. The known drive device is intended to be operated by means of any pressurised medium, such as air, oil, cooling water or fuel. Also other examples of the driving are defined. This document also discloses various embodiments of the centrifuge rotor. The known device is also adapted to enable discharge of the cleaned crankcase gases from the centrifugal separator to the surroundings or to the air intake of the combustion engine.

SE-522 473 (Alfa Laval AB) discloses another device for cleaning of crankcase gases from a combustion engine. The device comprises an inlet conduit, which is connected to a crankcase of the combustion engine, a centrifugal separator, which receives crankcase gases from the crankcase via the inlet conduit and which comprises a centrifuge rotor for centrifuging the crankcase gases, a separate electric motor driving the centrifuge rotor, and an outlet conduit for discharging cleaned crankcase gases from the centrifugal separator. This device also comprises a control equipment for controlling the rotation speed of the electric motor and thus of the centrifuge rotor. The purpose of this controlling is in the first place to provide an efficient cleaning of the crankcase gases. The known control equipment is adapted to control and change the rotation speed of the electric motor depending on a variety of different parameters.

WO2004/001200 (Alfa Laval Corporate AB) discloses a further device for cleaning of crankcase gases from a combustion engine. The device is similar to the device disclosed in the above-mentioned SE-522 473 and comprises a control equipment for controlling the rotation speed of the electric motor and thus of the centrifuge rotor. The purpose of this controlling is in the first place to provide an efficient cleaning of the crankcase gases. The known control equipment is adapted to control and change the rotation speed of the electric motor depending on a variety of different parameters in such a way that the gas pressure in the crankcase is maintained at a desired level.

SUMMARY OF THE INVENTION

An object of the present invention is to remedy the problem identified above and to provide a device which in a reliable and secure manner permits the maintaining of a desired gas pressure in the crankcase.

Another object is to provide a device which in a reliable and secure manner permits maintaining of a desired gas pressure in the crankcase both in the case that the desired gas pressure is lower than the surrounding atmospheric pressure and in the case that the desired gas pressure is higher than the surrounding atmospheric pressure.

This object is achieved by means of the device initially defined, wherein the rotary speed of the drive device, and thus the rotary speed of the centrifuge rotor, is controllable depending on the gas pressure in the crankcase and that the device comprises an export conduit, which is connected to the inlet conduit and adapted to enable discharge of a flow of crankcase gases from the crankcase by-passing the centrifugal separator depending on the gas pressure in the crankcase.

By means of this combination of features it is ensured that a desired gas pressure is maintained in the crankcase during operation of the device and the combustion engine. It is possible to prevent in a reliable manner, the gas pressure from sinking below a predetermined minimum level or rising above a predetermined maximum level. This is due to the device comprising two possibilities to compensate for a changed gas pressure, the device is suitable to be used in all kinds of combustion engines, and more specifically in such engines that are operated at a subpressure in the crankcase and such engines that are operated at an overpressure in the crankcase. It is possible by means of the defined export conduit to prevent that the gas pressure in the crankcase exceeds a level that is too high, that could damage for instance the crankcase gaskets. By means of the defined rotary speed control it may also be prevented that the gas pressure in the crankcase comes below a too low, unallowable level by means of a decrease of the rotary speed of the drive device.

According to an embodiment of the present invention, the export conduit comprises a one-way valve, which permits the discharge of crankcase gases but prevents flow in an opposite direction. Thanks to such a one-way valve, the device may advantageously be used in combustion engines operating at a subpressure in the crankcase. Advantageously, the one-way valve may be adapted to open for the discharge of crankcase gases when the pressure upstream of the one-way valve during operation exceeds a determined opening pressure that is related to the gas pressure prevailing in the crankcase. In such a way it can be ensured that the discharge of crankcase gases is initiated first when the gas pressure in the crankcase exceeds a determined critical level. Furthermore, the one-way valve may comprise an adjustment member for adjustment of the opening pressure. Such an adjustment may be made for instance manually before the combustion engine and the device are started.

According to a further embodiment of the invention, the device comprises control equipment for controlling the device, and a sensor, which is connected to the control equipment and adapted to provide a value of a parameter related to the gas pressure in the crankcase. Advantageously, the control equipment is adapted to control and change the rotary speed of the drive device during operation of the device in response to the value. In such a way, a quick and efficient controlling is achieved, which substantially immediately can compensate for a quick increase or decrease of the gas pressure in the crankcase.

According to a further embodiment of the invention, the inlet conduit comprises a first throttling member provided between the crankcase and the export conduit for throttling the flow of crankcase gases from the crankcase. Advantageously, the first throttling member may comprise an adjustment member for adjustment of the size of the throttling. Furthermore, the inlet conduit may comprise a second throttling member provided between the export conduit and the centrifugal separator for throttling of the flow to the centrifugal separator. Also the second throttling member may comprise an adjustment member for adjustment of the size of the throttling. The throttling members are advantageously adjusted when the combustion engine operates at full load.

According to a further embodiment of the invention, the device comprises an import conduit, which is connected to the inlet conduit and adapted to enable feeding of a flow of air from the surroundings to the centrifugal separator depending on the gas pressure in the inlet conduit. By means of such an import conduit it is possible to prevent in a reliable manner that the gas pressure in the crankcase comes below a too low unallowable level that could damage the crankcase gaskets.

According to a further embodiment of the invention, the first throttling member is provided between the crankcase and the import conduit. Furthermore, the second throttling member may be provided between the import conduit and the centrifugal separator.

According to a further embodiment of the invention, the import conduit comprises a one-way valve, which permits the feeding of air to the inlet conduit but prevents a flow in an opposite direction. Advantageously, the one-way valve may be adapted to open for s feeding air to the inlet conduit when the pressure downstream of the one-way valve during operation is below a determined opening pressure that is related to the gas pressure prevailing in the inlet conduit. In such a way it is ensured that the feeding of air is initiated first when the gas pressure in the crankcase comes below a predetermined critical level. Furthermore, the one-way valve may comprise an adjustment member for adjusting the opening pressure. Such an adjustment may be made for instance manually before the combustion engine and the device are started.

According to a further embodiment of the invention, the outlet conduit is adapted to discharge the cleaned crankcase gases to the surrounding atmosphere. It is also possible to let the outlet conduit be adapted to discharge the cleaned crankcase gases to a suction conduit for sucking combustion air to the combustion engine.

The object is also achieved by the device comprising an export conduit connected to the inlet conduit and adapted to enable discharge of a flow of crankcase gas from the crankcase by-passing the centrifugal separator depending on the gas pressure in the crankcase, and an import conduit, which is connected to the inlet conduit and adapted to enable feeding of a flow of air from the surroundings to the centrifugal separator depending on the gas pressure in the inlet conduit.

By this combination of features it may be ensured that a desired gas pressure is maintained in the crankcase during operation of the device and the combustion engine. It is possible to prevent in a reliable manner that the gas pressure sinks below a predetermined minimum level or rises above a predetermined maximum level. Thanks to the fact that the device comprises two possibilities to compensate for a changed gas pressure, the device is suitable to be used in all kinds of combustion engines, and more specifically both in such engines that are operated at a subpressure in the crankcase and such engines that are operated at an overpressure in the crankcase. By means of the defined export conduit, it is possible to prevent that the gas pressure in the crankcase exceeds a too high unallowable level. By means of the defined import conduit, it is possible to prevent in a reliable manner that the gas pressure in the crankcase comes below a too low unallowable level.

The object is also achieved by the device initially defined, wherein the rotary speed of the drive device, and thus the rotary speed of the centrifuge rotor, is controllable depending on the gas pressure in the crankcase and that the device comprises an import conduit, which is connected to the inlet conduit and adapted to enable feeding of a flow of air from the surroundings to the centrifugal separator depending on the gas pressure in the inlet conduit.

Also by means of this combination of features it may be ensured that a desired gas pressure is maintained in the crankcase during operation of the device and the combustion engines. It is possible to prevent in a reliable manner that the gas pressure sinks below a predetermined minimum level or rises above a predetermined maximum level. Thanks to the fact that the device comprises two possibilities to compensate for a changed gas pressure, the device is suitable to be used in all kinds of combustion engines, and more specifically both in such engines that are operated at a subpressure in the crankcase and such engines that are operated at an overpressure in the crankcase. By means of the defined rotary speed control, it may be prevented that the gas pressure in the crankcase exceeds a too high unallowable level by an increase of the rotary speed of the drive device. By means of the defined import conduit it is possible to prevent in a reliable manner that the gas pressure in the crankcase goes below a too low unallowable level.

BRIEF DESCRIPTION OF THE DRAWINGS

The invention is now to be explained more closely through a description of various embodiments and with reference to the drawings attached hereto.

DETAILED DESCRIPTION OF VARIOUS EMBODIMENTS OF THE INVENTION

FIGS. 1-4 disclose schematically a combustion engine 1 comprising a cylinder housing 2 with a number of cylinders (not shown), and a crankcase 3 which is mounted to a bottom side of the cylinder housing 2. The crankcase 3 forms an inner space for the crank shaft (not shown) and an oil pan in a lower part of the inner space. The inner space of the crankcase 3 is sealed against the surroundings by means of a gasket 4 in a manner known. In the inner space of the crankcase 3, a gas pressure prevails, which may be higher or lower than the surrounding atmospheric pressure. Furthermore, the combustion engine 1 comprises a suction conduit 5 for suction of combustion air/fuel and an exhaust conduit 6 for discharging combustion gases from the combustion engine 1. In the embodiments disclosed, the combustion engine 1 also comprises a turbo member 7 which increases the pressure of the combustion air by means of a compressor driven by the exhaust gases via a turbine.

The combustion engine 1 is provided with or connected to a device for cleaning crankcase gases which are present in the inner space of the crankcase 3. This device comprises a centrifugal separator 10 which may be of a kind known. Examples of useful centrifugal separators 10 are disclosed in the initially discussed patent documents. The centrifugal separator 10 comprises a centrifuge rotor 11 which is rotatably mounted in a substantially stationary casing 12. The centrifuge rotor 11 is driven by a separate drive device 13.

Figure 1:
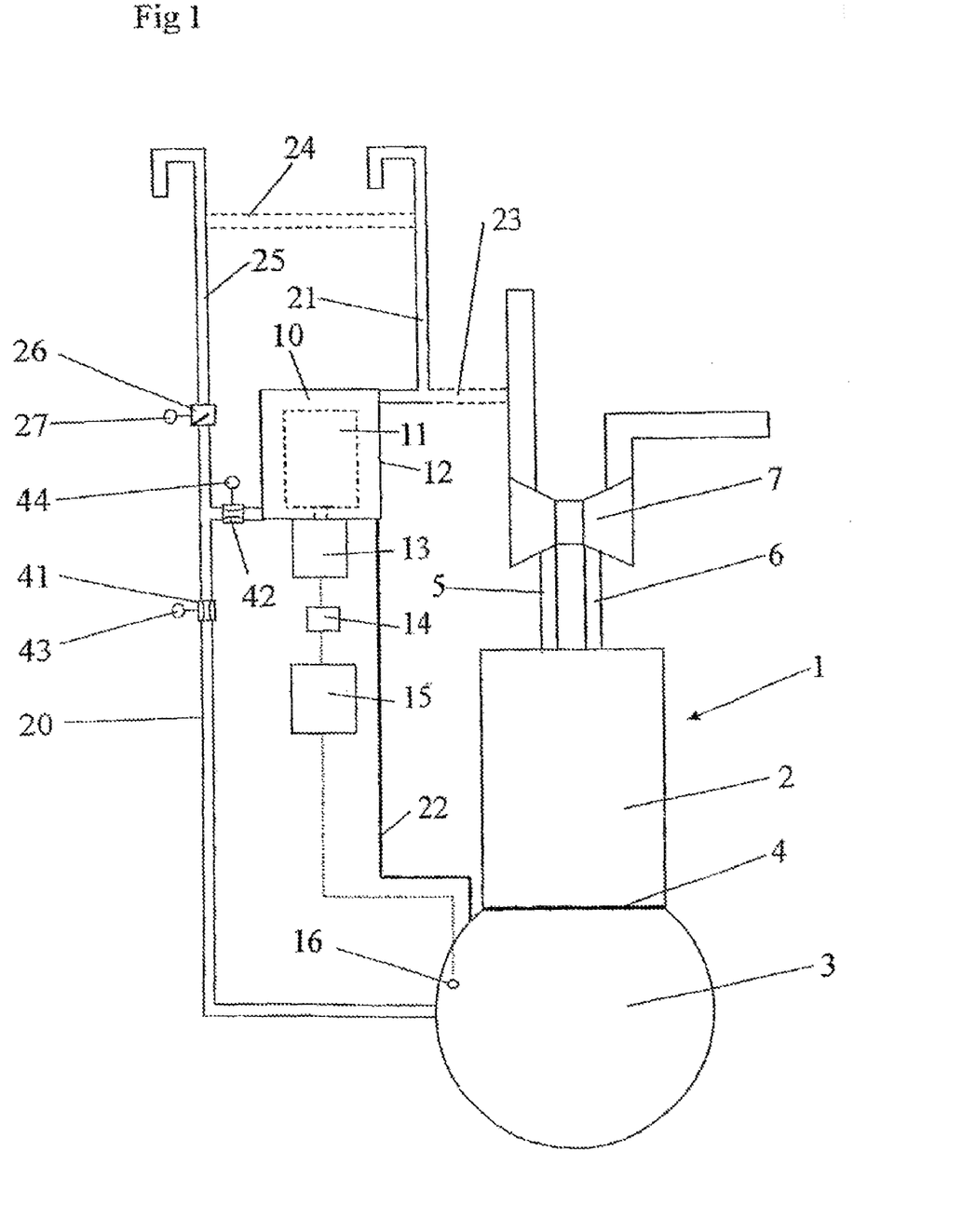
FIG. 1 discloses schematically a view of a combustion engine having a device according to a first embodiment of the invention FIG. 2 discloses schematically a view of a combustion engine having a device according to a second embodiment of the invention FIG. 3 discloses schematically a view of a combustion engine having a device according to a third embodiment of the invention FIG. 4 discloses schematically a view of a combustion engine having a device according to a fourth embodiment of the invention.
Figure 2:
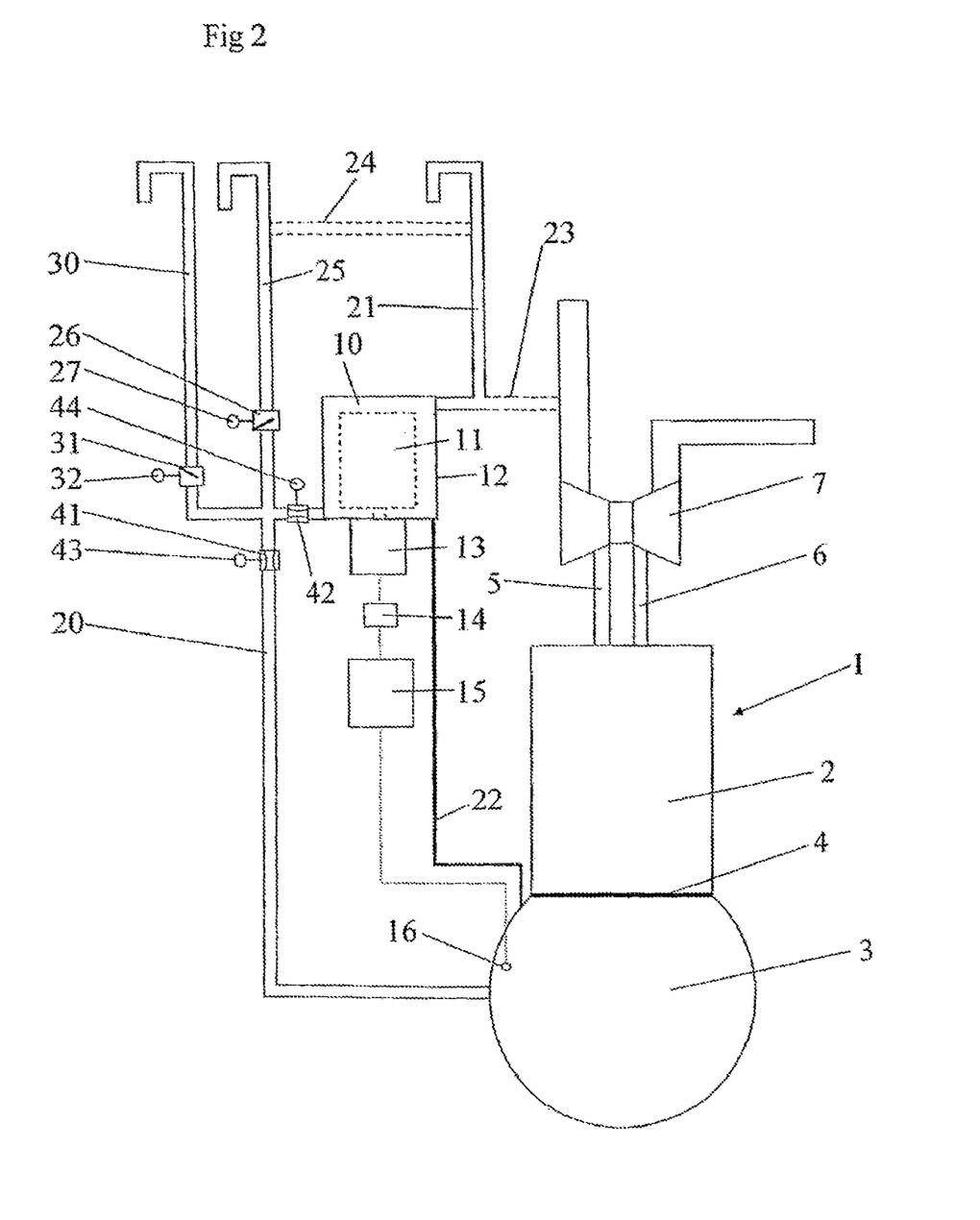
Figure 4:
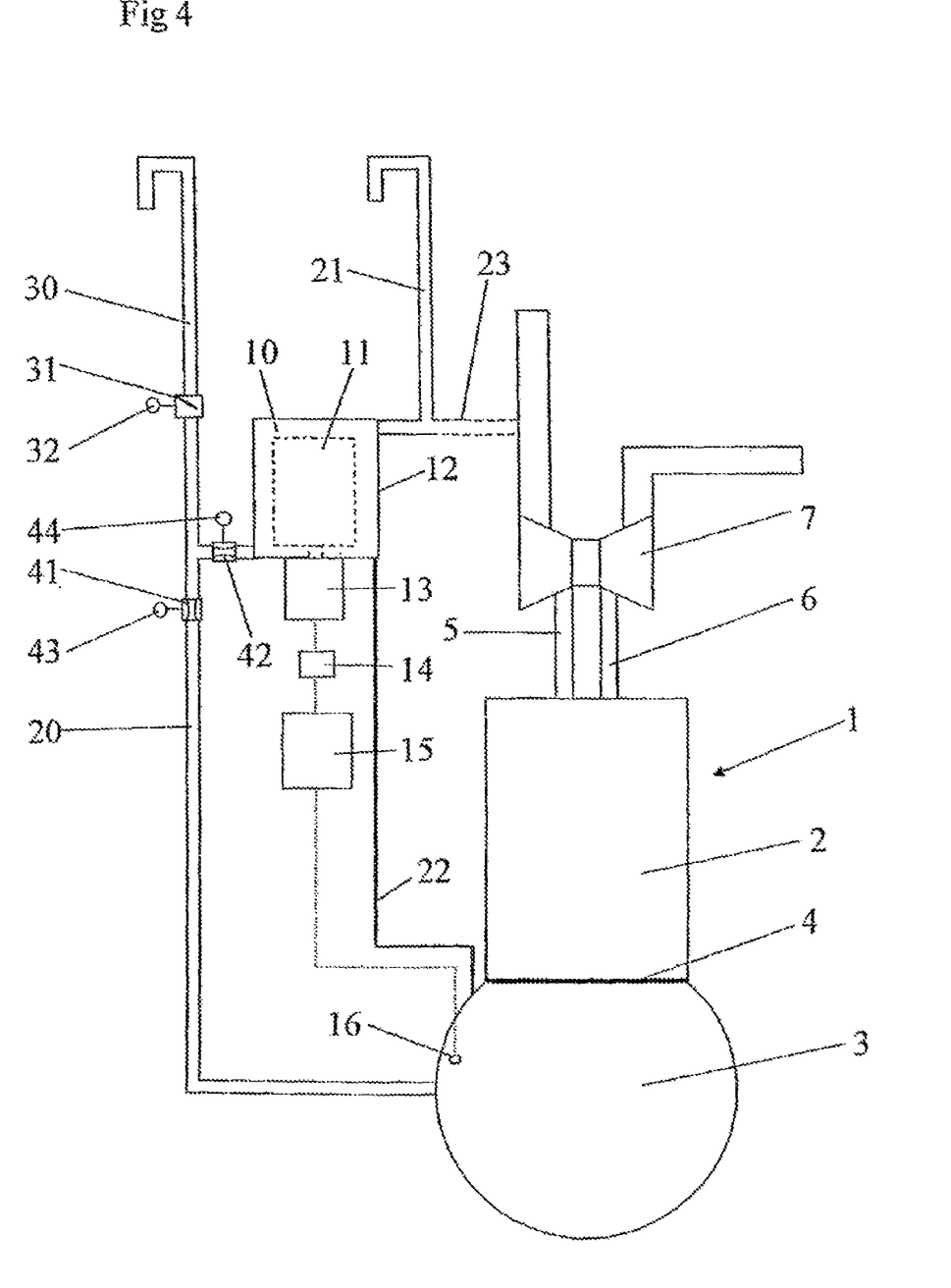

In the embodiments disclosed in FIGS. 1, 2 and 4, the drive device 13 comprises an electric motor having a controllable rotary speed. The electric motor may for instance comprise an electrical asynchronous motor, the rotary speed of which may be controlled by means of control equipment comprising a frequency converter 14 and a control unit 15. The control unit 15 may receive input signals from a plurality of different sensors. In the embodiments disclosed, the device comprises one or several sensors 16 which are provided to sense a parameter related to the gas pressure in the crankcase 3. Such a sensor 16 may for instance be a pressure sensor which directly senses the gas pressure in the inner space of the crankcase 3. Such a sensor 16 may also be formed by a flow sensors sensing the flow of crankcase gases from the inner space of the crankcase 3.

The device also comprises an inlet conduit 20, which is adapted to be connected to the crankcase 3 and is connected to an inlet of the centrifugal separator 10. Furthermore, the device comprises an outlet conduit 21, which is connected to an outlet from the inner space of the centrifugal separator 10. During operation of the combustion engine 1 and the device, crankcase gases will thus be conveyed from the inner space of the crankcase 3 via the inlet conduit 20 to the centrifugal separator 10, where the crankcase gases are brought to rotate at a high speed by means of the centrifuge rotor 10, wherein liquid components, mainly oil, may be separated from the crankcase gases. The cleaned crankcase gases are conveyed from the centrifugal separator via the outlet conduit 21. The separated liquid (the oil) may be returned to the combustion engine via a return conduit 22.

The cleaned crankcase gases may via the outlet conduit 21 be discharged to the surrounding atmosphere. It is also possible to recirculate the cleaned crankcase gases to the suction conduit 5 of the combustion engine 1, and more specifically to the inlet side of the turbo member 7, which is indicated by the dashed recirculation conduit 23. The discharge of the cleaned crankcase gases to the atmosphere may take place directly to the surrounding atmosphere via the outlet conduit 21 or via a connection conduit 24, see FIGS. 1-3, and an export conduit 25, explained in greater detail herein.

Figure 3:
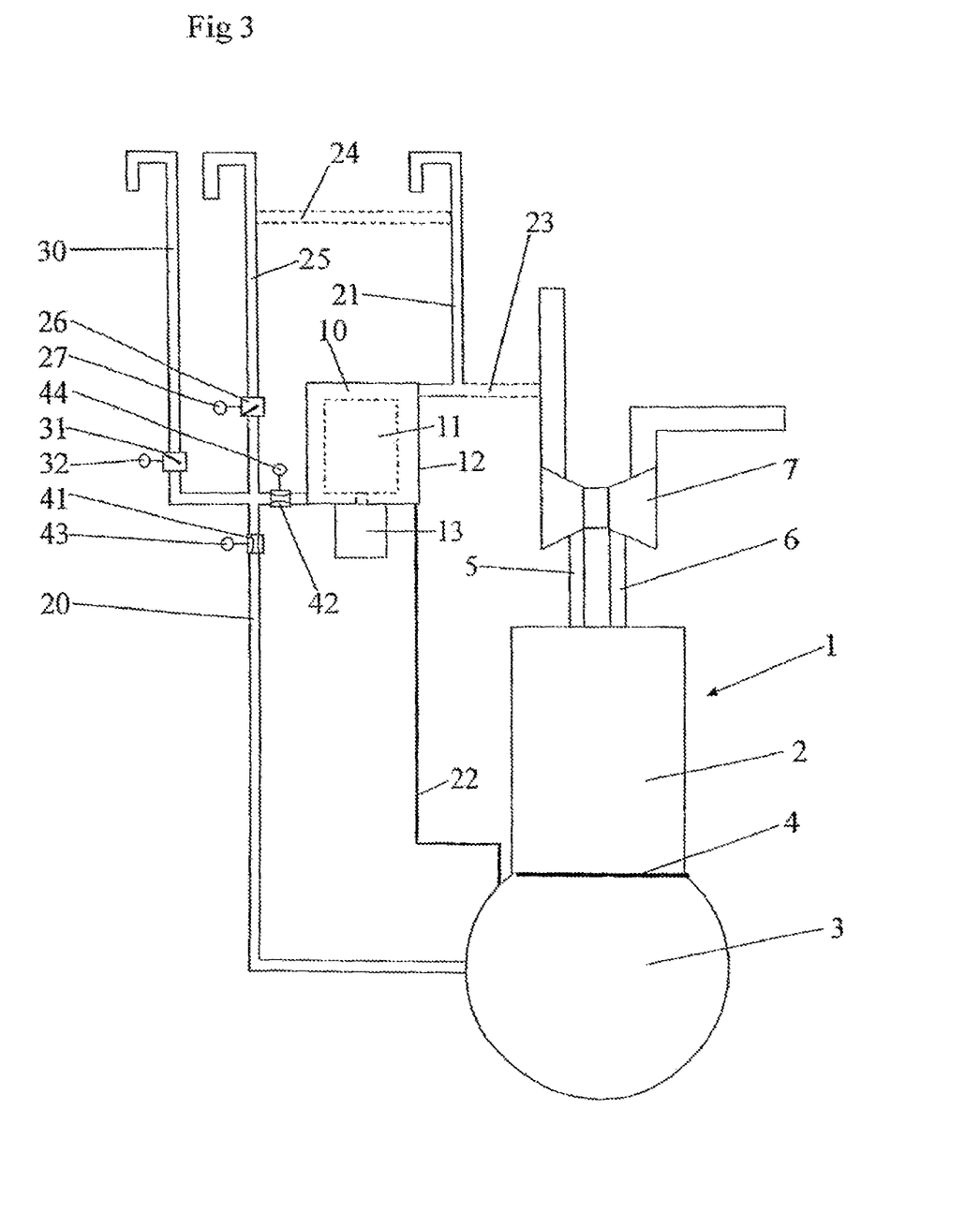

The export conduit 25, see FIGS. 1-3, can be included as a part of the device. The export conduit 25 is connected to the inlet conduit 20 and adapted to enable discharge of a flow of crankcase gases from the crankcase 3 by-passing the centrifugal separator 10 depending on the gas pressure in the crankcase 3. The export conduit 25 comprises a one-way valve 26, which permits discharge of crankcase gases but prevents a flow in an opposite direction. The one-way valve 26 is adapted to open for the discharge of crankcase gases when the pressure upstream of the one-way valve 26 during operation exceeds a predetermined opening pressure that is related to the gas pressure prevailing in the crankcase 3, i.e. the pressure upstream of the one-way valve 26 between the one-way valve 26 and the crankcase 3. The one-way valve 26 may advantageously comprise an adjustment member 27 for adjustment of the opening pressure.

The device may also comprise an import conduit 30, see FIGS. 2-4, which is connected to the inlet conduit 20 and adapted to enable feeding of a flow of air from the surroundings to the centrifugal separator 10 depending on the gas pressure in the inlet conduit 20. The import conduit 30 comprises a one-way valve 31, which permits feeding of air to the inlet conduit 20 but prevents flow in an opposite direction. The one-way valve 31 is adapted to open for the feeding of air to the inlet conduit 20 when the pressure downstream of the one-way valve 31 during operation comes below a determined opening pressure that is related to the gas pressure prevailing in the inlet conduit 20. Also the one-way valve 31 may comprise an adjustment member 32 for adjustment of the opening pressure.

The inlet conduit comprises a first throttling member 41 for throttling the flow of crankcase gases from the crankcase 3. The first throttling member 41 is provided on the inlet conduit 20 between the crankcase 3 and the export/import conduit 25, 30. Furthermore, the inlet conduit 20 comprises a second throttling member 42 for throttling the flow to the centrifugal separator 10. The second throttling member 42 is provided on the inlet conduit 20 between the export/import conduit 25, 30 and the centrifugal separator 10. The first throttling member 41 comprises an adjustment member 43 for adjusting the amount of throttling. Also the second throttling member 42 comprises an adjustment member 44 for adjusting the amount of throttling.

FIG. 1 illustrates a first embodiment of the invention according to which the device comprises an electric motor 13 having a controllable rotor speed for quick control of the rotary speed of the centrifuge rotor 11, and the above explained export conduit 25.

FIG. 2 illustrates a second embodiment of the invention according to which the device in addition to the electric motor 13 and the export conduit 25 also comprises the above explained import conduit 30.

FIG. 3 illustrates a third embodiment of the invention according to which the device comprises the above explained export conduit 25 and the above explained import conduit 30. In the third embodiment, a simpler variant of the drive device 13, however, is used for driving the centrifuge rotor 11, and more specifically a drive device 13 without a controllable rotary speed. Such a drive device 13 may be realised by means of an electric motor of suitable kind or a motor driven by means of any fluid, for instance oil from the oil system for the combustion engine 1. Examples of different variants of drive devices 13 and the driving of the device 13 are disclosed in the above-mentioned WO99/56883.

FIG. 4 illustrates a fourth embodiment of the invention according to which the device comprises the above explained import conduit 30 and an electric motor 13 having a rotary speed control.

The invention is not limited to the embodiments disclosed but may be varied and modified within the scope of the following claims.

What is claimed is:

1. A device for cleaning crankcase gases from a combustion engine comprising:
   an inlet conduit connectable to a crankcase of a combustion engine;
   a centrifugal separator, which is adapted to receive a flow of crankcase gases from the crankcase via the inlet conduit and which comprises a rotatable centrifuge rotor for centrifuging the crankcase gases;
   a drive device, which drives the centrifuge rotor;
   an outlet conduit, which is adapted to discharge cleaned crankcase gases from the centrifugal separator,
   the rotary speed of the drive device, and thus the rotary speed of the centrifuge rotor being controllable depending on the gas pressure in the crankcase; and wherein
   the device further comprises an export conduit, connected to the inlet conduit and adapted to enable discharge of a flow of crankcase gases from the crankcase by-passing the centrifugal separator depending on the gas pressure in the crankcase.

2. A device according to claim 1, wherein the export conduit comprises a one-way valve, which permits said discharge of crankcase gases but prevents a flow in an opposite direction.

3. A device according to claim 2, wherein the one-way valve openable for said discharge of crankcase gases when the pressure upstream of the one-way valve during operation exceeds a predetermined opening pressure that is related to the gas pressure prevailing in the crankcase.

4. A device according to claim 3, wherein the one-way valve comprises an adjustment member for adjustment of the opening pressure.

5. A device according to claim 1, wherein the device comprises a control equipment for controlling the device, and a sensor, which is connected to the control equipment and adapted to provide signals to the controller indicative of a value of a parameter related to the gas pressure in the crankcase.

6. A device according to claim 5, wherein the control equipment controls and changes the rotary speed of the drive device during operation of the device in response to said value.

7. A device according to claim 1, wherein the inlet conduit comprises a first throttling member provided between the crankcase and the export conduit for throttling of the flow of crankcase gases from the crankcase.

8. A device according to claim 7, wherein the first throttling member comprises an adjustment member for adjustment of the size of the throttling.

9. A device according to claim 1, wherein the inlet conduit comprises a second throttling member provided between the export conduit and the centrifugal separator for throttling of the flow to the centrifugal separator.

10. A device according to claim 9, wherein the second throttling member comprises an adjustment member for adjustment of the size of the throttling.

11. A device according to claim 1, wherein the device comprises an import conduit, which is connected to the inlet conduit and adapted to enable feeding of a flow of air from the surroundings to the centrifugal separator depending on the gas pressure in the inlet conduit.

12. A device according to claim 7, wherein the first throttling member is provided between the crankcase and the import conduit.

13. A device according to claim 11, wherein the first throttling member is provided between the crankcase and the import conduit.

14. A device according to claim 9, wherein the second throttling member is provided between the import conduit and the centrifugal separator.

15. A device according to claim 11, wherein the second throttling member is provided between the import conduit and the centrifugal separator.

16. A device according to claim 11, wherein the import conduit comprises a one-way valve, which permits said feeding of air to the inlet conduit but prevents a flow in an opposite direction.

17. A device according to claim 16, wherein the one-way valve is adapted to open for said feeding of air to the inlet conduit when the pressure downstream the one-way valve during operation is below a determined opening pressure that is related to the gas pressure prevailing in the inlet conduit.

18. A device according to claim 17, wherein the one-way valve comprises an adjustment member for adjustment of the opening pressure.

19. A device according to claim 1, wherein the outlet conduit is adapted to discharge the cleaned crankcase gases to the surrounding atmosphere.

20. A device according to claim 1, wherein the outlet conduit is adapted to discharge the cleaned crankcase gases to a suction conduit for sucking combustion air to the combustion engine.

21. A device for cleaning of crankcase gases from a combustion engine comprising:
   an inlet conduit connectable to a crankcase of the combustion engine;
   a centrifugal separator, which is adapted to receive a flow of crankcase gases from the crankcase via the inlet conduit and which comprises a rotatable centrifuge rotor for centrifuging the crankcase gases;
   an outlet conduit, which is adapted to discharge clean crankcase gases from the centrifugal separator;
   an export conduit, which is connected to the inlet conduit and adapted to enable discharge of a flow of crankcases from the crankcase by-passing the centrifugal separator depending on the gas pressure in the crankcase, and wherein
   an import conduit, which is connected to the inlet conduit and adapted to enable feeding of a flow of air from the surroundings to the centrifugal separator depending on the gas pressure in the inlet conduit.

22. A device according to claim 21, wherein the export conduit comprises a one-way valve, which permits said discharge of crankcase gases but prevents a flow in an opposite direction.

23. A device according to claim 22, wherein the one-way valve is adapted to open for said discharge of crankcase gases when the pressure upstream the one-way valve during operation exceeds a determined opening pressure that is related to the gas pressure prevailing in the crankcase.

24. A device according to claim 21, wherein the import conduit comprises a one-way valve, which permits said feeding of air to the inlet conduit but prevents a flow in an opposite direction.

25. A device according to claim 24, wherein the one-way valve is adapted to open for said feeding of air to the inlet conduit when the pressure downstream the one way valve during operation is below a determined opening pressure that is related to the gas pressure prevailing in the inlet conduit.

26. A device for cleaning of crankcase gases from a combustion engine comprising:
- an inlet conduit, which is adapted to be connected to a crankcase of the combustion engine;
- a centrifugal separator, which is adapted to receive a flow of crankcase gases from the crankcase via the inlet conduit and which comprises a rotatable centrifuge rotor for centrifuging the crankcase gases;
- a drive device which drives the centrifuge rotor;
- an outlet conduit, which is adapted to discharge clean crankcase gases from the centrifugal separator;
- the rotary speed of the drive device, and thus the rotary speed of the centrifuge rotor being controllable depending on the gas pressure in the crankcase; and wherein
- the device further comprises an import conduit, which is connected to the inlet conduit and adapted to enable feeding of a flow of air from the surroundings to the centrifugal separator depending on the gas pressure in the inlet conduit.

27. A device according to claim 26, wherein the device comprises a control equipment for controlling the device and a sensor, which is connected to the control equipment and adapted to provide a value of a parameter related to the gas pressure in the crankcase.

28. A device according to claim 27, wherein the control equipment is adapted to control and change the rotary speed of the drive device during operation of the device in response to said value.

29. A device according to claim 26, wherein the import conduit comprises a one-way valve, which permits said feeding of air but prevents a flow in an opposite direction.

30. A device according to claim 29, wherein the one-way valve is adapted to open for said feeding of air to the inlet conduit when the pressure downstream the one-way valve during operation is below a determined opening pressure that is related to the gas pressure prevailing in the inlet conduit.

* * * * *